United States Patent [19]

Vetter

[11] 4,069,953

[45] Jan. 24, 1978

[54] WATCH STRAPS

[76] Inventor: Günther Vetter, Spernbauerstrasse 5, A-4560 Kirchdorf, Austria

[21] Appl. No.: 689,847

[22] Filed: May 25, 1976

[51] Int. Cl.² .................................................. A44C 5/14
[52] U.S. Cl. ..................................... 224/4 E; 24/236; 24/265 EC; 24/265 EE; 224/4 D
[58] Field of Search ............... 224/4 A, 4 D, 4 E, 4 F, 224/4 K, 5 R, 5 P, 26 D, 28 W; 24/3 J, 73 WW, 31 R, 35, 36, 236, 237, 241 WB, 243 SC, 265 R, 265 H, 265 EC, 265 EE, 265 SH, 265 WS, 241 S, 255 BS, 255 SL; 2/338; 428/99, 100; 63/3, 11

[56] References Cited

U.S. PATENT DOCUMENTS

| 3,369,722 | 2/1968 | Hetterich | 224/4 D |
| 3,516,631 | 6/1970 | Santucci | 24/255 SL X |
| 3,578,208 | 5/1971 | Herzog | 224/4 E |

FOREIGN PATENT DOCUMENTS

| 971,759 | 1/1951 | France | 24/265 WS |
| C6556 | 8/1956 | Germany | 224/4 D |
| 282,168 | 7/1952 | Switzerland | 24/265 WS |
| 442,834 | 1/1968 | Switzerland | 224/4 E |
| 255,784 | 1/1949 | Switzerland | 24/265 WS |
| 277,415 | 4/1949 | Switzerland | 24/265 WS |

Primary Examiner—Robert J. Spar
Assistant Examiner—Winston H. Douglas
Attorney, Agent, or Firm—Watson, Cole, Grindle & Watson

[57] ABSTRACT

A watch strap, the two strap portions whereof are formed of a core of plastics material with a clip embedded therein. The clip has a hook-shaped end which projects from the core and forms with the core an attachment means for attaching to a watch case. That part of the core vicinal the hook-shaped end is provided with incisions to impart ease of deformability thereto so that each watch strap portion can be readily attached to and detached from its respective securing point on the watch case.

10 Claims, 6 Drawing Figures

WATCH STRAPS

BACKGROUND OF THE INVENTION

The invention relates to a multi-layer watch strap each strap portion thereof having a plastics core which is at least partially coated preferably by leather, and a hook-like clip for fastening to a watch case.

It is already known to fasten each strap portion on a watch case by means of a hook-like clips. This offers the advantage of simplicity and durability, as compared to the conventional fastening by means of end loops which are laid around a bar of the watch case and either sewn, glued or affixed by means of a staple to each watch strap portion. A knows hook-like metal clip (for example reference West German Offenlegungsshrift 2129022) has an end portion inserted between the layers of a multi-layer watch strap and secured by means of a "plug" which traverses openings in the clip and also in the layers of the strap. Another prior disclosure (for example Swiss Pat. No. 493,223) makes use of a longitudinally slotted tube of elastically resilient material which is fastened on a reinforcing insert of a multi-layer watch strap. The slotted tube is hooked on the fastening bar of the watch case. Both known devices are relatively costly and do not ensure reliable connection of the watch strap to the watch case.

SUMMARY OF THE INVENTION

It is an object of the invention to provide uncomplicated but a secure fastening means for fastening a watch strap onto a watch case, which may be produced at low cost and without impairing the attractive appearance of the watch strap.

In accordance with the invention there is provided a multi-layer watch strap of the kind cited in the foregoing, wherein a hook-like clip is firmly cast integrally with the plastics core and is equipped at its open side with a catch formed by the plastics core. Due to the embeding of the hook-like clip in a massive plastics core, a firm connection is obtained between the watch strap and the clip which for its part is merely hooked into the securing bar of the watch case. The catch situated at the open side of the clip is formed in the simplest manner by the plastics core itself and prevents accidental unhooking of the clip from the watch case. By contrast, it is possible at any time however, after bending the catch, to unhook the watch strap from the watch case and rapidly to replace it by another watch strap. The watch may consequently be worn with different watch straps as desired. The plastics core forming the bearing part of the watch strap may in simple manner be coated with a facing which advantageously consists of leather. The watch strap thereby has the strength and durability of a plastics strap but has the appearance and other advantageous qualities of a leather watch strap.

According to a preferred form of the invention, the catch formed by the plastics material core is obtained by the fact that the plastics material core substantially closes off the open side of the clip and is elastically deformable in this area by means of at least one recess. In this way, the plastics material core forms an uncomplicated spring catch for the clip secured on the strap extremity. The elasticaly deformable portion of the plastics core may be bent away from the open side of the clip to permit the clip to be hooked to a bar of the watch case. This portion thereupon returns into its initial position and forms a catch securely anchoring the watch strap on the case.

Other different embodiments of the catch are possible within the scope of the invention. Incisions starting from the open side of the clip and extending in the longitudinal direction of the plastics material core or obliquely with respect to the same, may be incorporated in the plastics core. These incisions which need be no deeper than a few millimetres and may moreover extend through a part only of the thickness of the plastics material core, form comb-like fins which may elastically be pivoted away from the open side of the clip and after returning into the their initial positio form a secure catch.

Another form of embodiment of the invention consists in that at the open side of the clip, the plastics core is provided with holes which are either through holes or blind bores. An elastically deformable catch is the result if, in accordance with another modified form of the invention, at least one transversely extending passage is cut out of th plastics core. This passage may have an optional cross-section, as may the holes. It may be larger at the outer sides of the plastics material core than in the central portion of the same, and may also extend at an acute angle with respect to the longitudinal axis of the plastics core.

At least one incision starting from the underside of the plastics material core and extending transversely or obliquely with respect to the same, may moreover be incorporated in the plastics material core. These incisions form one or more flaps at the open side of the clip, which allows easy hooking on to the watch case to form secure locking thereto. An analogous action is obtained if the catch consists of a flexible extension of the plastics core, which projects towards the open extremity of the clip.

BRIEF DESCRIPTION OF THE DRAWINGS

The invention will now be described by way of example with reference to the accompanying drawings.

DETAILED DESCRIPTION OF PREFERRED EMBODIMENTS

Figure 1:
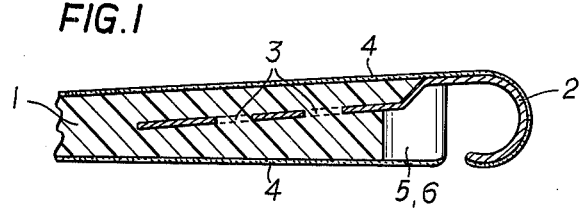
FIG. 1 shows the end portion of a strap in longitudinal cross-section.

The watch strap shown in the drawings comprises a plastics material core 1, wherein is anchored a hook-like clip 2. That part of the clip 2 anchored within the plastics material core 1 is provided with excisions 3 or extensions which provide a better connection thereto.

On the upper side as well as on the lower side, the plastics material core 1 is provided with a facing 4 which advantageously consists of leather the facing 4 extends over the extremity of the clip 2 and thus imparts the appearance of a leather strap to the watch strap. The plastics material core 1 extends up to the extremity of the clip 2 and closes off its open side. The plastics material core is elastically deformable in this area.

Figure 2:
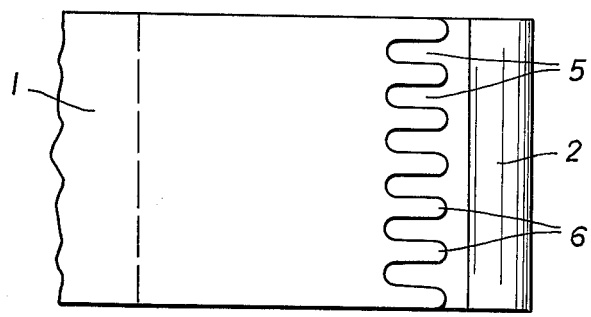
FIG. 2 shows an underneath view of the strap portion according to FIG. 1.

According to FIGS. 1 and 2, incisions 5 which form fins 6 arranged in a comb-like pattern, are situated in front of the open side of the clip 2, and are incorporated in the plastics material core 1. The incisions 5 extend in the longitudinal direction of the plastics material core 1. They may however also extend obliquely with respect to its longitudinal direction or be arranged in a random pattern. The fins 6 form a catch in front of the open side of the clip 2. The fins 6 may be bent away for hooking the clip 2 on to the bar of a watch case but subsequently return elastically into their initial position and prevent the clip 2 from being unhooked from the bar of the watch case.

Figure 3:
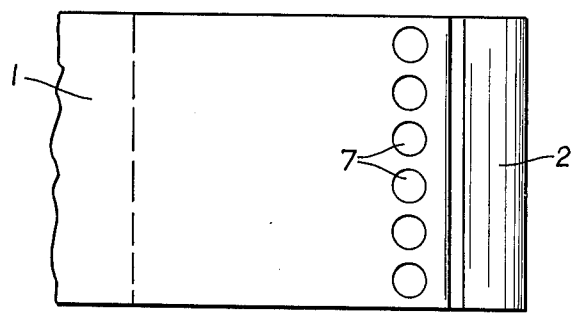
FIG. 3 shows an embodiment of the invention in inverted plan view.
Figure 4:
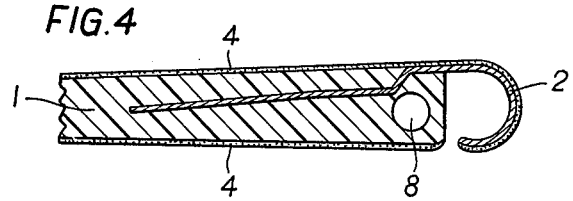
FIGS. 4, 5 and 6 show three other embodiments of the invention in longitudinal cross-section.
Figure 5:
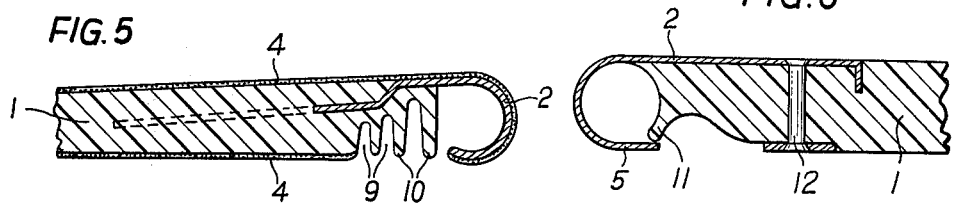
Figure 6:
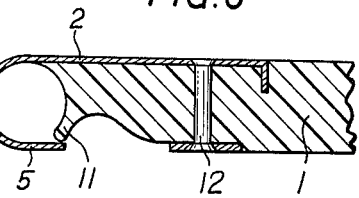

With reference to FIG. 3 the excisions within the plastics material core 1 are formed by holes 7 which are situated in a row along the open side of the clip 2. The holes 7 may have an optional cross-section, extend throughout the thickness of the plastics material core 1 or be blind bores. They establish elastic deformability of the plastics material core 1 in its portion situated at the open side of the clip 2. FIG. 4 shows another modified form, according to which a transversely extending passage 8 is cut out of the plastics material core 1 along the open side of the clip 2. In FIG. 5, incisions 9 extend from the underside of the plastics material core 1, and form flaps 10 extending transversely across the width of the plastics material core 1. They may also be positioned in a vee pattern in an inverted plan view if the longitudinal cross-sectional view according to FIG. 5. According to FIG. 6, the catch consists of an extension 11 of the plastics material core 1, which is situated before the open extremity of the clip 2 and may be bent away from the latter elastically. The clip 2 is integrally formed with the surface of the plastics material core 1 at this point and is secured thereto by a rivet 12.

The differently formed excissions in the portion of the plastics material core 1 closing off the open side of the clip 2 establish an elastically deformable spring catch for the clip 2 in all the examples illustrated and described, so that the clip may rapidly and simply be hooked on to a transverse bar conventionally arranged on the watch case for securing the watch strap, without requiring the use of tools. The elastically deformable spring catch then forms a barrier which reliably prevents an accidental unhooking of the clip 2 and thus of the watch strap, after hooking on the clip 2.

What is claimed is:

1. A multi-layered watch band having two strap portions for attachment to a watch case, each said strap portion comprising:

a plastic core having an elastically deformable end portion;

a clip including an extended shank portion at least partially embedded in said plastic core and a rigid hook-shaped end portion extending frm and adjacent to said elastically deformable end portion;

said rigid hook-shaped end portion being adaptable to engage watch case attachment means by deformatin of said elastically deformable end portion whereby said elastically deformable end portion is bent away from the open side of said rigid hook-shaped end portion to permit said clip to be hooked, and said elastically deformable end portion being adapted to form a lock with said hook-shaped end portion by closing said open side while said clip remains hooked to said watch case attachment means.

2. A multi-layered watch band as in claim 1 wherein said elastically deformable end portion includes elastically deformable incisions therein.

3. A multi-layered watch band as in claim 2 wherein comb-like incisions are formed in the plastic core adjacent said elastically deformable end portion extending substantially laterally thereacross.

4. A multi-layered watch band as in claim 3 wherein said comb-like incisions extend entirely laterally across said elastically deformable end portion.

5. A multi-layered watch band as in claim 3 wherein said comb-like incisions extend obliquely across said elastically deformable end portion.

6. A multi-layered watch band as in claim 3 wherein said incisions are holes formed in the region of the elastically deformable end portion of said plasticcore and extending substantially parallel to the plane of said hook-shaped end portion.

7. A multi-layered watch band as in claim 6 wherein said holes extend completely through said plastic core.

8. A multi-layered watch band as in claim 6 wherein said holes are blind holes.

9. A multi-layered watch band as in claim 3 wherein said incision is a canal extending laterally from one side of said elastically deformable end portion to the other side thereof.

10. A multi-layered watch band as in claim 2 wherein the elastically deformable end portion includes a flexible extension extending adjacent to the end of said rigid-hook-shaped portion.

* * * * *